US009942437B2

(12) United States Patent
Kawamata

(10) Patent No.: US 9,942,437 B2
(45) Date of Patent: Apr. 10, 2018

(54) IMAGE READING APPARATUS

(71) Applicant: BROTHER KOGYO KABUSHIKI KAISHA, Nagoya-shi, Aichi-ken (JP)

(72) Inventor: Noriyuki Kawamata, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/437,642

(22) Filed: Feb. 21, 2017

(65) Prior Publication Data
US 2017/0251123 A1     Aug. 31, 2017

(30) Foreign Application Priority Data

Feb. 25, 2016 (JP) .................................. 2016-034575

(51) Int. Cl.
*H04N 1/04* (2006.01)
*H04N 1/10* (2006.01)
*H04N 1/00* (2006.01)

(52) U.S. Cl.
CPC ....... *H04N 1/1061* (2013.01); *H04N 1/00519* (2013.01); *H04N 1/1043* (2013.01); *H04N 2201/0081* (2013.01); *H04N 2201/0422* (2013.01)

(58) Field of Classification Search
CPC ............... H04N 1/1061; H04N 1/1043; H04N 1/00519; H04N 2201/0081; H04N 2201/0422

USPC .................................................. 358/497, 474
See application file for complete search history.

(56) References Cited

U.S. PATENT DOCUMENTS

| | | | |
|---|---|---|---|
| 6,285,441 B1 | 9/2001 | Takahara | |
| 2007/0047023 A1* | 3/2007 | Oguri | H04N 1/0313 358/474 |
| 2013/0083375 A1 | 4/2013 | Osakabe et al. | |

FOREIGN PATENT DOCUMENTS

| | | |
|---|---|---|
| JP | 4011700 B2 | 11/2007 |
| JP | 5776476 B2 | 9/2015 |

* cited by examiner

*Primary Examiner* — Houshang Safaipour
(74) *Attorney, Agent, or Firm* — Merchant & Gould P.C.

(57) ABSTRACT

An image reading apparatus is provided. The image reading apparatus includes: a platen glass; a moving member; a reading section held by the moving member, the reading section having a reading surface, a light-receiving element, a substrate section, and a case section; a transmission member; and a first biasing section. The moving member includes a facing surface that faces the substrate section. The case section includes a first wall and a second wall. The transmission member includes a first contacting section, a second contacting section, and a connecting section. The first biasing section is disposed such that its one end makes a contact with the facing surface of the moving member and its other end makes a contact with the connecting section of the transmission member.

10 Claims, 10 Drawing Sheets

IMAGE READING APPARATUS

CROSS REFERENCE TO RELATED APPLICATION

The present application claims priority from Japanese Patent Application No. 2016-034575, filed on Feb. 25, 2016, the disclosure of which is incorporated herein by reference in its entirety.

BACKGROUND

Field of the Invention

The present invention relates to an image reading apparatus.

Description of the Related Art

Known as an example of a conventional image reading apparatus is an image reading apparatus that includes a platen glass, a guide member, a line sensor unit, and a coil spring. The platen glass supports a sheet by a front surface of the platen glass. The guide member is capable of reciprocating movement in a sub-scanning direction along a reverse surface of the platen glass, in a state of holding the line sensor unit. The line sensor unit has a reading surface and a plurality of optical sensor elements, and these elements are housed in a box-shaped housing. The reading surface includes a selfoc lens array and the like, and faces the platen glass. The optical sensor elements are each aligned in a main scanning direction.

Generally, the line sensor unit has a substrate. The substrate is held inside the housing in a state of facing the reading surface from an opposite to the platen glass. That is, the substrate is disposed in a bottom part of the housing, and a back of the substrate is covered by the housing. Moreover, each of the optical sensor elements is installed in a circuit board provided on a surface of the substrate.

The guide member includes a facing surface. The facing surface faces a back surface of the line sensor unit, specifically a back surface of the housing, from an opposite to the reading surface. The coil spring biases the line sensor unit in a first direction which is a direction approaching the platen glass. The coil spring is disposed such that its one end makes a contact with the facing surface of the guide member and its other end makes a contact with the back surface of the line sensor unit.

In the conventional image reading apparatus which is of the above-described configuration, the line sensor unit held in the guide member moves in the sub-scanning direction along the platen glass, in a state of being biased toward the platen glass by the coil spring, below the sheet supported by the platen glass. As a result, an image of the sheet supported by the front surface of the platen glass is read by the line sensor unit.

SUMMARY

Incidentally, in the image reading apparatus, it has been required to simplify the housing of the line sensor unit for miniaturization or lowering of manufacturing costs. In this respect, in the above-described conventional image reading apparatus, it is conceivable for a back-surface wall configuring the back surface of the housing in the line sensor unit to be thinned, the back-surface wall to be removed to expose the substrate, or the substrate to be covered by the likes of a sheet-like cover member. However, if the back-surface wall of the housing covering the substrate is simplified, it becomes easy for a biasing force of the coil spring to act on the substrate, and it becomes easy for the circuit board of the substrate to warp. As a result, in this image reading apparatus, there is a possibility that positioning of each of light-receiving elements installed in the circuit board is misaligned, and there is a possibility that reading performance of the line sensor unit lowers.

The present disclosure was made in view of the above-described conventional circumstances, and has an object of providing an image reading apparatus capable of achieving simplification of a reading section while suppressing a lowering of reading performance of the reading section.

According to an aspect of the present disclosure, there is provided an image reading apparatus configured to read an image of a sheet, comprising:

a platen glass configured to support the sheet on one surface of the platen glass;

a moving member configured to be movable in a sub-scanning direction along the other surface of the platen glass;

an image reader supported by the moving member, the image reader including:
  a reading surface facing the other surface of the platen glass;
  a plurality of light-receiving elements aligned in a main scanning direction orthogonal to the sub-scanning direction;
  a substrate facing the reading surface from an opposite to the platen glass and including a circuit board in which each of the light-receiving elements is arranged; and
  a case holding the substrate;

a transmission member arranged between the image reader and the moving member; and a first biasing portion configured to bias the image reader in a first direction which is a direction approaching the platen glass, wherein the moving member includes a facing surface that faces the substrate from an opposite to the reading surface, wherein the case includes:
  a first wall which extends toward the moving member and which is adjacent to one of two edges, of the reading surface, extending in the main scanning direction; and
  a second wall which holds the substrate between the second wall and the first wall, which extends toward the moving member, and which is adjacent to the other of the edges, of the reading surface, extending in the main scanning direction, wherein the transmission member includes:
  a first contacting portion which makes a contact with an end of the first wall in the first direction, wherein the end of the first wall is located at a position adjacent to the substrate;
  a second contacting portion which makes a contact with an end of the second wall in the first direction, wherein the end of the second wall is located at a position adjacent to the substrate; and
  a connecting portion which faces the substrate and which extends in the sub-scanning direction to connect the first contacting portion and the second contacting portion, and wherein one end of the first biasing portion makes a contact with the facing surface of the moving member and the other end of the first biasing portion makes a contact with the connecting portion of the transmission member.

The image reading apparatus of the present disclosure includes a transmission member which is of the above-described configuration. Another end of a first biasing section makes a contact with a connecting section of the transmission member, a first contacting section of the transmission member abuts in a first direction on an end at a position adjacent to a substrate section of a first wall, and a second contacting section of the transmission member abuts in the first direction on an end at a position adjacent to the substrate section of a second wall. As a result, a biasing force of the first biasing section is transmitted to a case. In this way, a reading section is biased toward a platen glass in a state that it is difficult for the biasing force of the first biasing section to act on the substrate section. Therefore, in this image reading apparatus, it becomes difficult for a circuit board of the substrate section to warp, even when simplification of a back surface configuration of the reading section is sought. As a result, misalignment of positioning of each of light-receiving elements installed in the circuit board can be suppressed.

Therefore, in the image reading apparatus of the present disclosure, simplification of the reading section can be achieved while a lowering of reading performance of the reading section is suppressed. Moreover, miniaturization or lowering of manufacturing costs of the image reading apparatus can be achieved.

DESCRIPTION OF THE EMBODIMENTS

An embodiment embodying the present disclosure will be described below with reference to the drawings.

Figure 1:
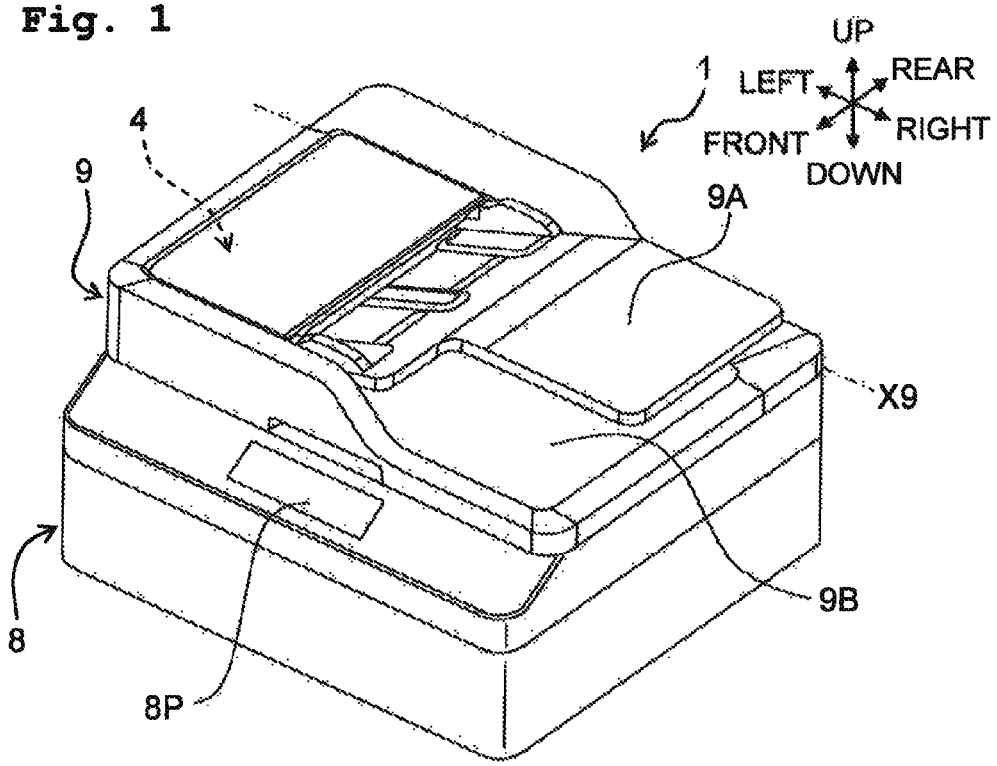
FIG. 1 is a perspective view of an image reading apparatus of an embodiment.

As depicted in FIG. 1, an image reading apparatus 1 of the present embodiment is an example of a specific mode of the image reading apparatus of the present disclosure. In FIG. 1, a side where an operating panel 8P is disposed is defined as a front of the apparatus, a left side when facing the operating panel 8P is defined as left, whereby each of directions of front-rear, left-right, and up-down are displayed. Moreover, each of directions depicted in each of the drawings from FIG. 2 onwards are all displayed corresponding to each of the directions depicted in FIG. 1. Each of elements included in the image reading apparatus 1 will be described below based on FIG. 1, and so on.

Overall Configuration

As depicted in FIGS. 1 to 5, the image reading apparatus 1 includes a main body 8, an openable section 9, an image forming unit 5, a reading unit 3, and a conveyer 4. The main body 8 is a flat substantially box-shaped body. As depicted in FIG. 1, the operating panel 8P which is a touch panel is provided on a front surface of the main body 8.

Figure 2:
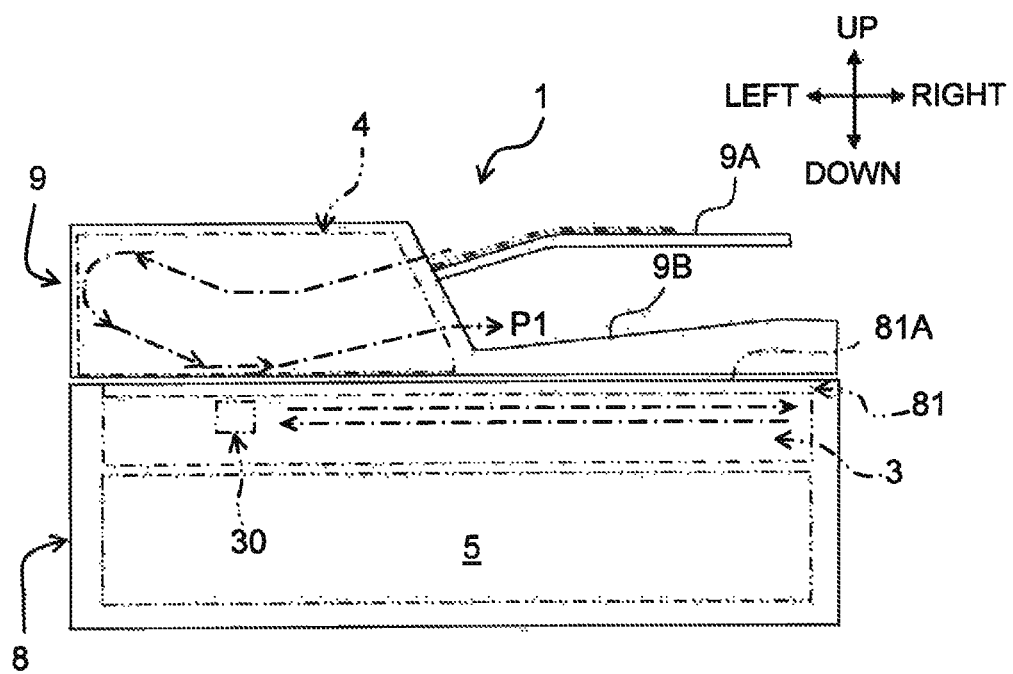
FIG. 2 is a schematic front view of the image reading apparatus of the embodiment.

As depicted in FIG. 2, the image forming unit 5 is provided in a lower portion of the main body 8. The image forming unit 5 forms an image on a recording medium by an ink jet system or a laser system. The reading unit 3 is provided in an upper portion of the main body 8. The reading unit 3 is used when reading an image of a sheet. The conveyer 4 is provided in the openable section 9. The conveyer 4 is used when causing the reading unit 3 to read images of a plurality of sheets while the sheets are being conveyed sequentially along a conveyance path P1.

As depicted in FIGS. 3 to 8, the reading unit 3 includes a scanner housing 10 and a platen glass 81.

Figure 3:
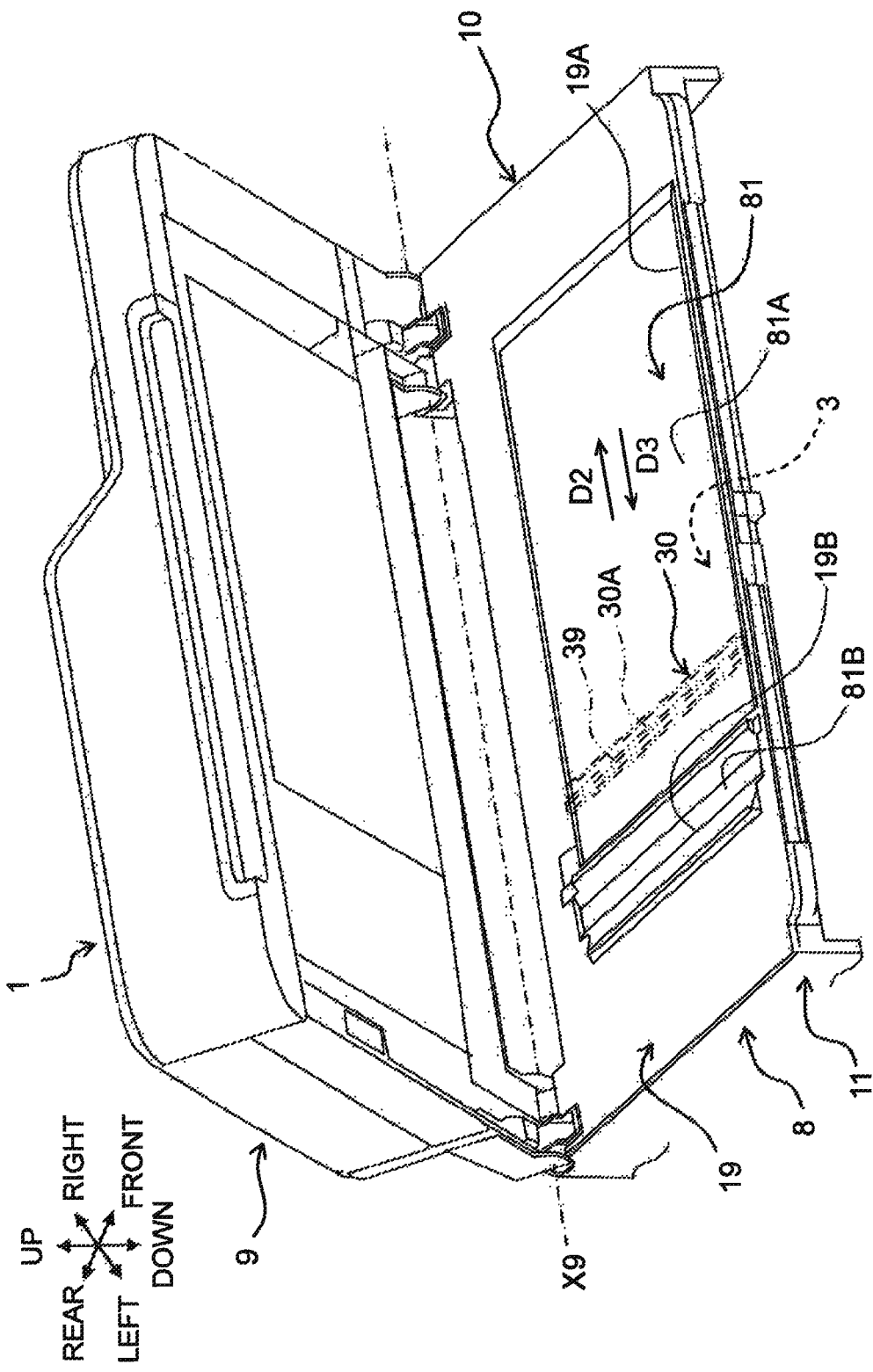
FIG. 3 is a partial perspective view of the image reading apparatus of the embodiment.
Figure 5:
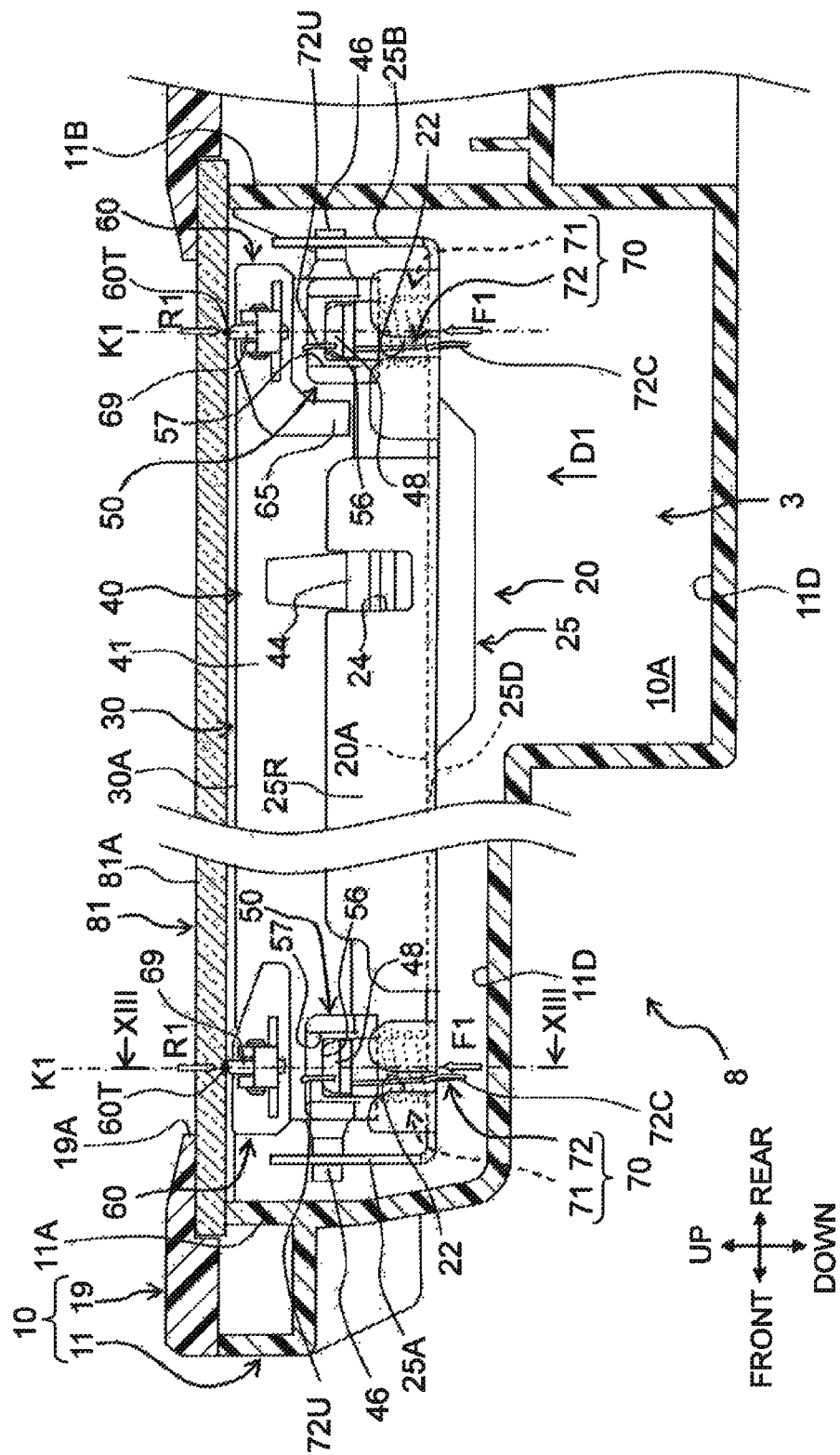
FIG. 5 is a partial cross-sectional view depicting a cross section taken along the line A-A of FIG. 4.

As depicted in FIGS. 3 and 5, the scanner housing 10 has a scanner base 11 and a scanner top 19 combined in the up-down direction. In the present embodiment, the scanner base 11 and the scanner top 19 are resin members manufactured by the likes of injection molding of a thermoplastic resin.

Figure 4:
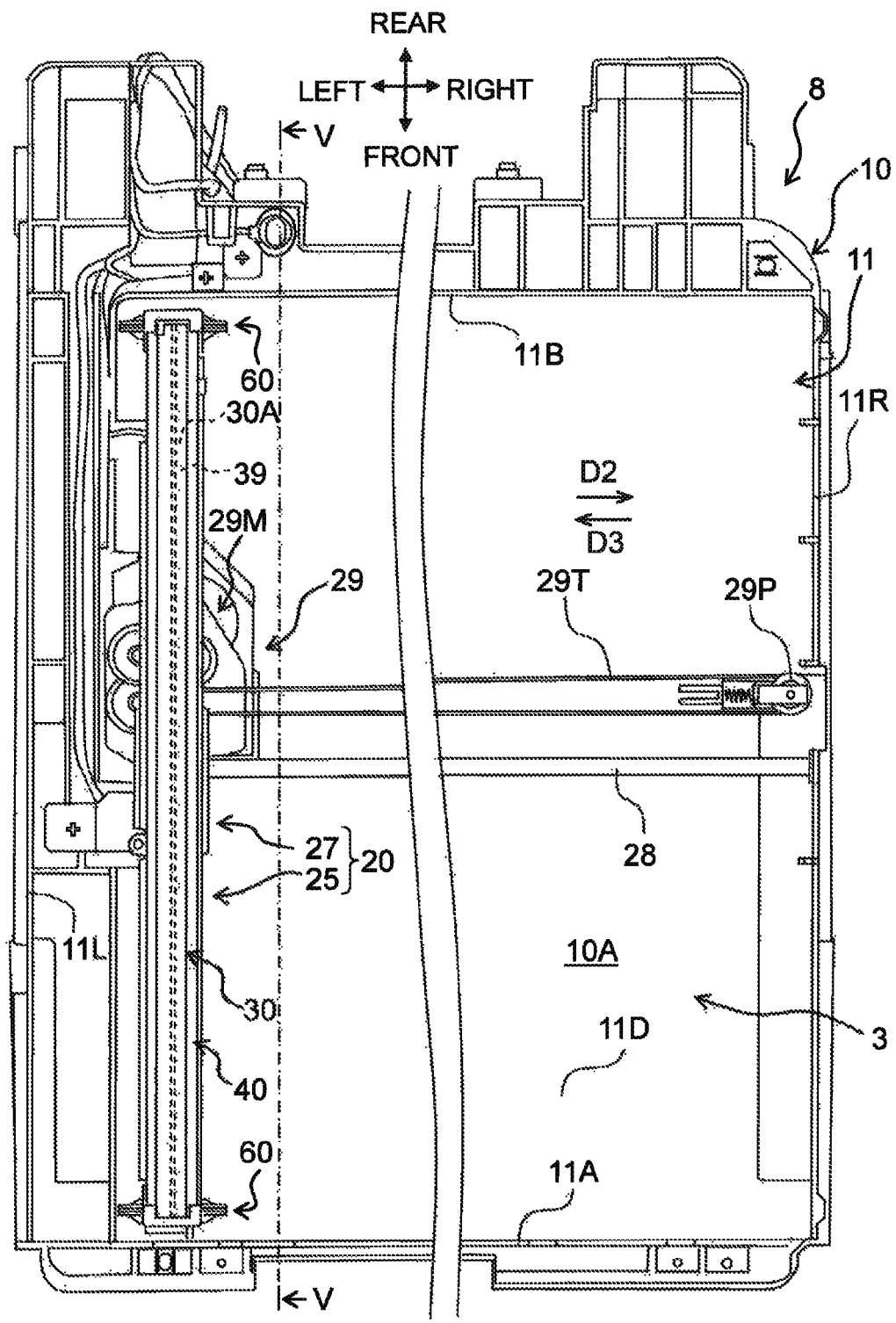
FIG. 4 is a partial top view depicting mainly a scanner housing, a reading section, and a moving member.
Figure 6:
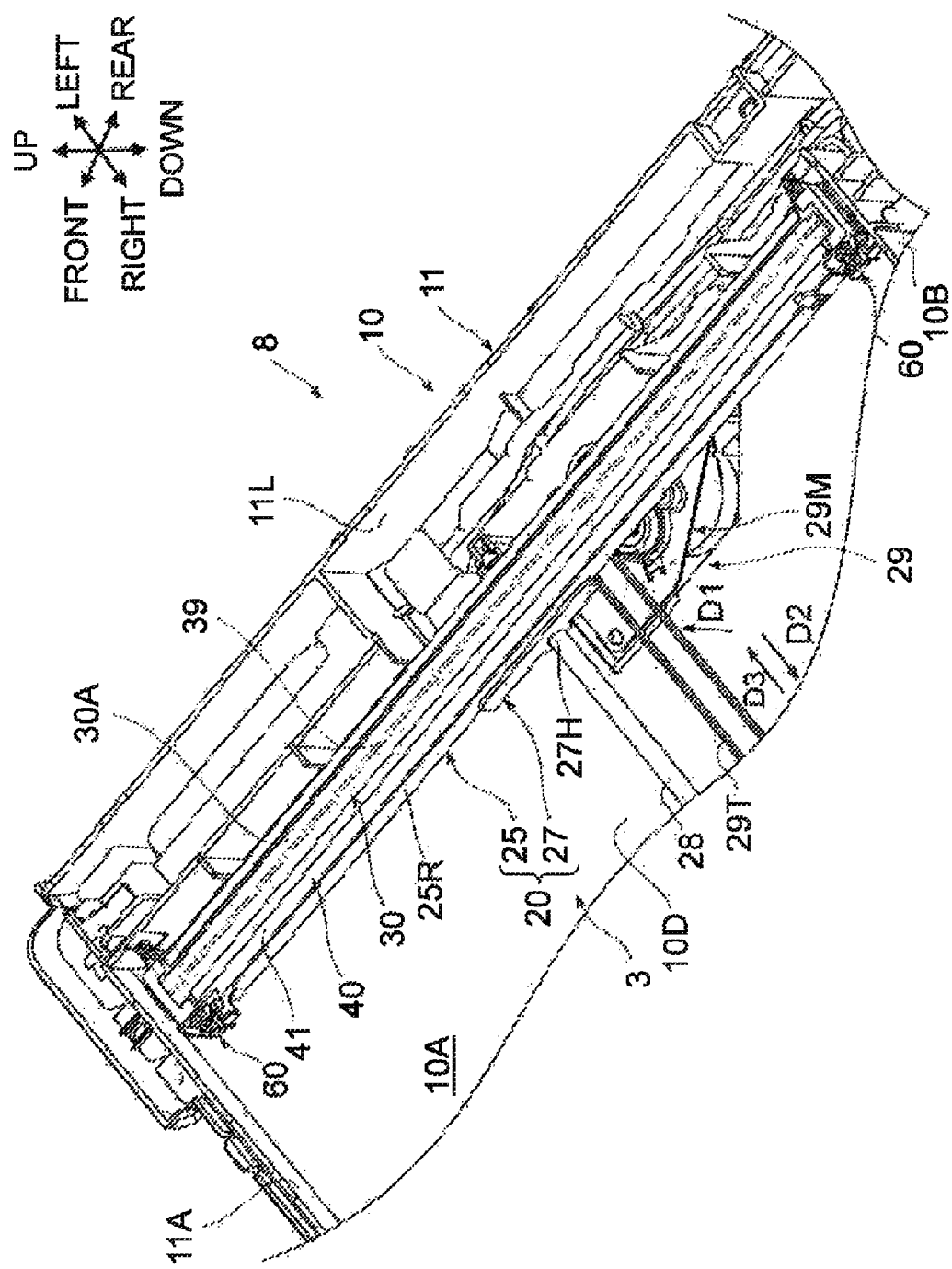
FIG. 6 is a partial perspective view depicting mainly the scanner housing, the reading section, and the moving member.
Figure 7:
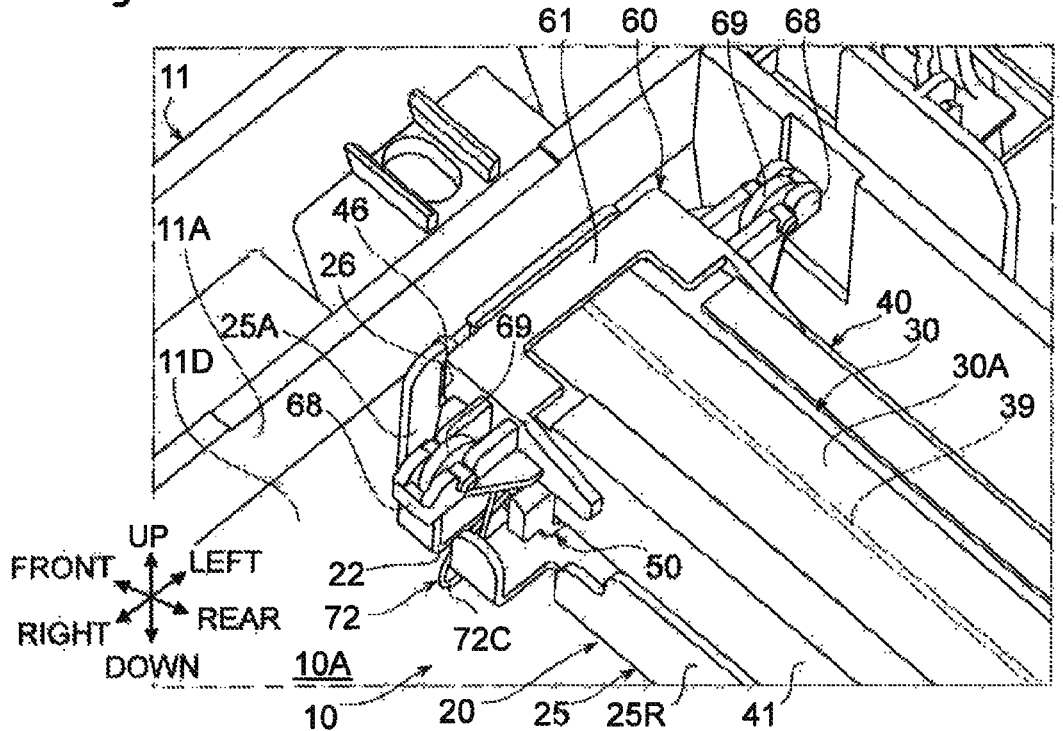
FIG. 7 is a partial perspective view depicting, enlarged, a main part of FIG. 6.
Figure 8:
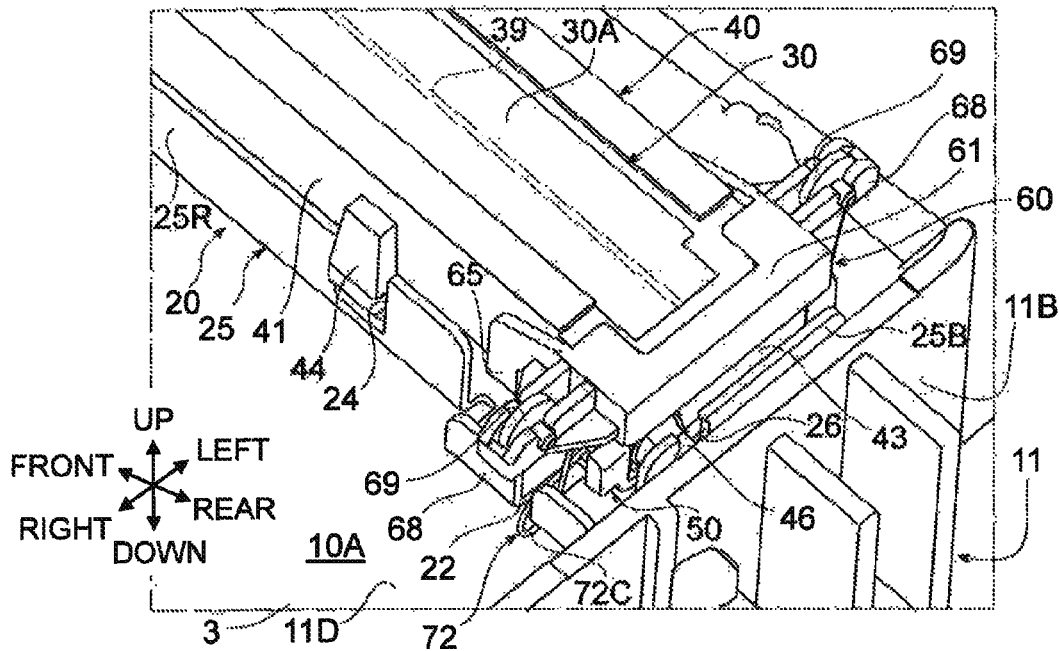
FIG. 8 is a partial perspective view depicting, enlarged, a main part of FIG. 6.

As depicted in FIGS. 4 to 8, a bottom wall 11D, a left wall 11L, a right wall 11R, a front wall 11A, and a rear wall 11B are formed in the scanner base 11. The bottom wall 11D is a substantially rectangular plane extending substantially horizontally as a whole, while including a plurality of steps or concavities/convexities. As depicted in FIGS. 4 and 6, the left wall 11L projects upwardly from a left end edge part of the bottom wall 11D. As depicted in FIG. 4, the right wall 11R projects upwardly from a right end edge part of the bottom wall 11D. As depicted in FIGS. 4 to 7, the front wall 11A projects upwardly from a front end edge part of the bottom wall 11D. As depicted in FIGS. 4, 5, and 8, the rear wall 11B projects upwardly from a rear end edge part of the bottom wall 11D. In other words, a peripheral edge of the bottom wall 11D of the scanner base 11 is surrounded by the left wall 11L, the right wall 11R, the front wall 11A, and the rear wall 11B, and an upper part of the scanner base 11 is opened. In other words, the scanner base 11 is configured in a box shape.

As depicted in FIG. 3, the scanner top 19 is a substantially frame-like member having a first opening 19A and a second opening 19B formed therein. The first opening 19A opens forming a large rectangular shape. The second opening 19B is positioned more leftward than the first opening 19A. The second opening 19B opens forming a rectangular shape which is elongated in the front-rear direction.

As depicted in FIG. 5, the scanner top 19 faces the bottom wall 11D of the scanner base 11 from above with a certain spacing. A peripheral part of the platen glass 81 is installed in the scanner housing 10 by being sandwiched from the up-down direction by the bottom wall 11D, left wall 11L, right wall 11R, front wall 11A, and rear wall 11B of the scanner base 11, and a peripheral part of the scanner top 19.

As depicted in FIGS. 4 to 8, a housing space 10A is formed in the scanner housing 10. The housing space 10A is surrounded by the bottom wall 11D, left wall 11L, right wall 11R, front wall 11A, and rear wall 11B of the scanner base 11, the scanner top 19, and the platen glass 81.

As depicted in FIGS. 4 and 6, a guide shaft 28 is arranged above the bottom wall 11D of the scanner base 11. The guide shaft 28 is positioned substantially in a center in the front-rear direction in the bottom wall 11D to extend in the left-right direction from a right wall 11R toward a left wall 11L of the scanner base 11.

In the present embodiment, the front-rear direction orthogonal to the left-right direction in which the guide shaft 28 extends is a main scanning direction. Moreover, the left-right direction in which the guide shaft 28 extends is a sub-scanning direction. Moreover, a direction orthogonal to the main scanning direction and the sub-scanning direction is the up-down direction.

As depicted in FIG. 3, a portion exposed from the first opening 19A of the scanner top 19, of a surface of the platen glass 81 is a first supporting surface 81A. The first supporting surface 81A supports a sheet in a stationary state from below when an image of that sheet is read by the reading unit 3. A read object sheet, as well as including a sheet, that is, a sheet of paper, an OHP sheet, or the like, includes also a book, and so on.

A portion exposed from the second opening 19B of the scanner top 19, of the surface of the platen glass 81 is a second supporting surface 81B. The second supporting surface 81B guides sheets conveyed one at a time by the conveyer 4, by contacting them from below, when images of those conveyed sheets are read by the reading unit 3.

Note that in the present embodiment, an object sheet whose image is read using the first supporting surface 81A is described as an original sheet, and an object sheet whose image is read while being conveyed by the conveyer 4 is described as a sheet. The original sheet and the sheet may be substantively the same.

As depicted in FIG. 1, the openable section 9 is swingably supported around an opening-and-closing axis X9 extending in the left-right direction, by an unillustrated hinge arranged in a rear end of the main body 8. The openable section 9 in a closed state depicted in FIGS. 1 and 2 covers the first supporting surface 81A from above. As depicted in FIG. 3, the openable section 9, by being swung around the opening-and-closing axis X9 such that its front end part is displaced upwardly and rearwards, exposes the first supporting surface 81A. This enables a user to support the original sheet on the first supporting surface 81A.

As depicted in FIGS. 1 and 2, a supply tray 9A and a discharge tray 9B are provided in the openable section 9. The supply tray 9A is positioned in a right portion of the openable section 9. The discharge tray 9B is positioned more downwardly than the supply tray 9A in the right portion of the openable section 9. Although illustration of this is omitted, the conveyer 4 includes a well-known configuration such as a conveyance roller or a separation roller. The conveyer 4 separates a plurality of sheets supported in the supply tray 9A, one at a time, and conveys the sheets sequentially along the conveyance path P1. Then, the conveyer 4 conveys those sheets toward the second supporting surface 81B, and after passing them above the second supporting surface 81B, discharges them toward the discharge tray 9B.

As depicted in FIGS. 4 to 13, the reading unit 3 includes a moving member 20, a scanning mechanism 29, a reading section 30, a spacer 60, a transmission member 50, and a biasing member 70. The moving member 20, the scanning mechanism 29, the reading section 30, the spacer 60, the transmission member 50, and the biasing member 70 are housed in the housing space 10A.

Specific Configuration of Moving Member

Figure 9:
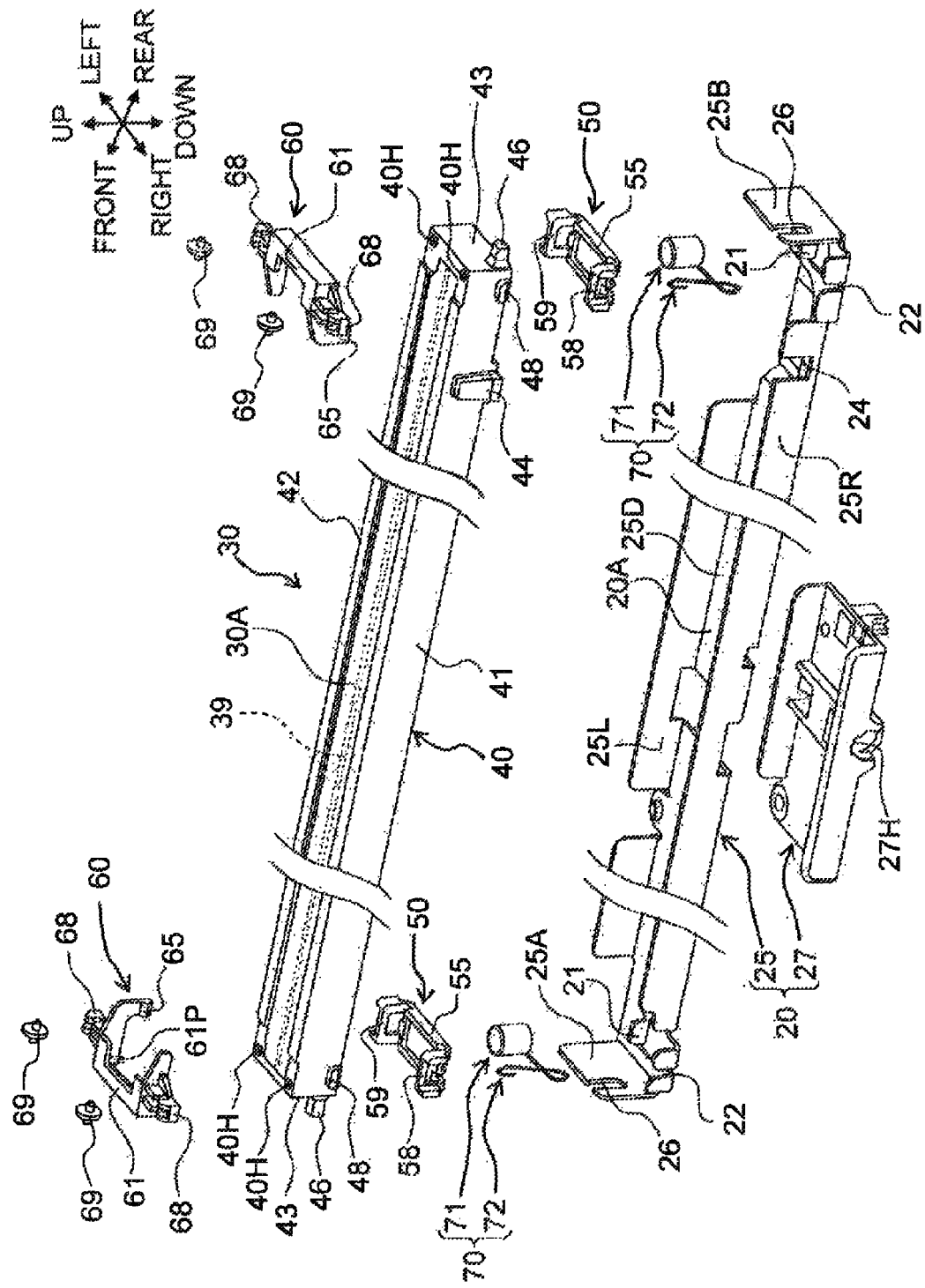
FIG. 9 is an exploded perspective view depicting a spacer, the reading section, a transmission member, a first and second biasing section, and the moving member.
Figure 10:
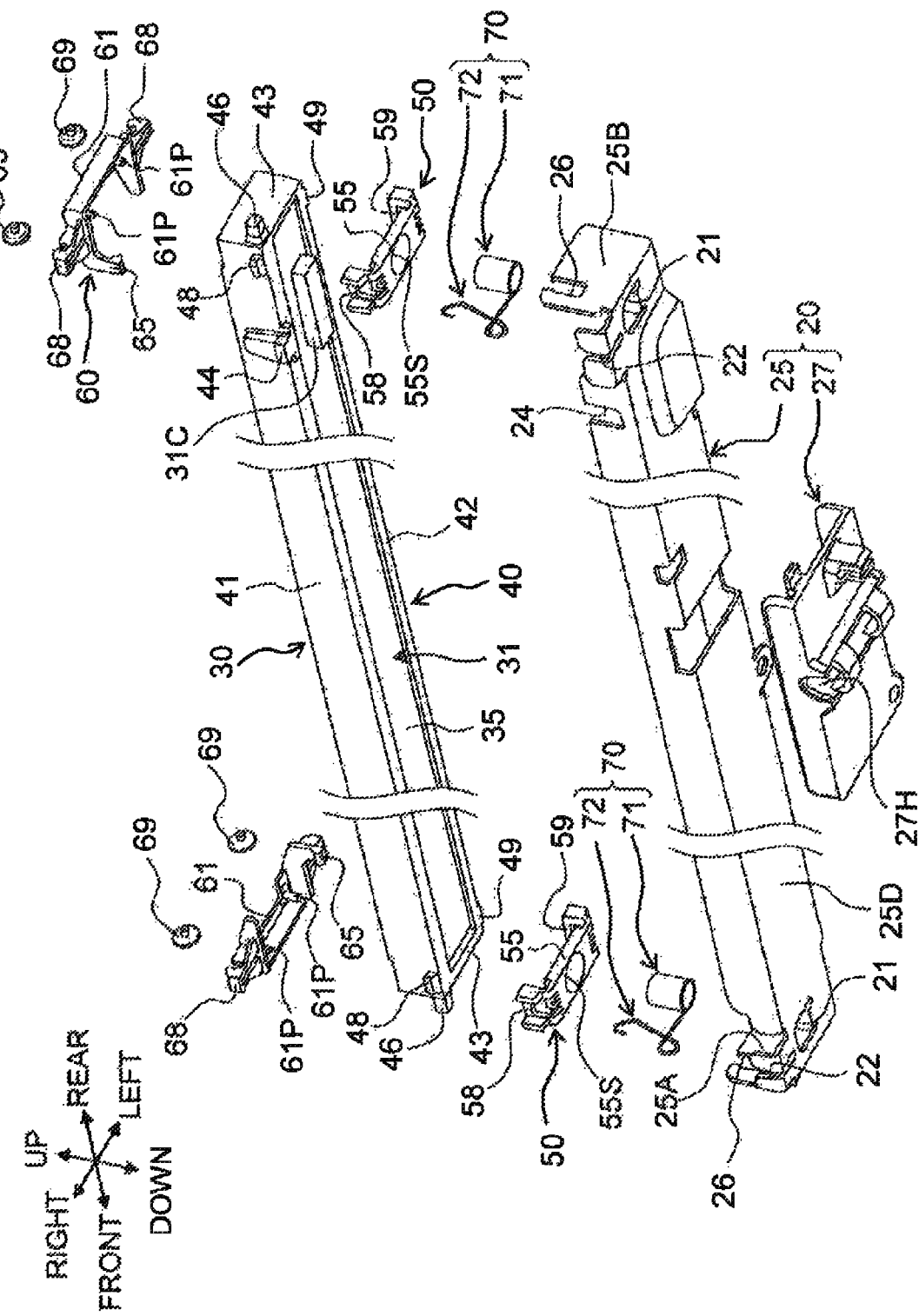
FIG. 10 is an exploded perspective view depicting the spacer, the reading section, the transmission member, the first and second biasing section, and the moving member.

As depicted in FIGS. 9 and 10, the moving member 20 has a holding member 25 and a guide member 27 combined therein.

In the present embodiment, the holding member 25 is formed by a plate, made of a metal, undergoing the likes of punching and folding. The holding member 25 includes a bottom plate 25D, lateral plates 25L, 25R, and supporting plates 25A, 25B. The bottom plate 25D is configured in a substantially rectangular shape whose length in the front-rear direction is larger than its length in the left-right direction. The lateral plate 25L on the left projects upwardly from a left end edge of the bottom plate 25D, and extends in the front-rear direction. The lateral plate 25R on the right projects upwardly from a right end edge of the bottom plate 25D, and extends in the front-rear direction. The supporting plate 25A at the front projects upwardly from a front end edge of the bottom plate 25D, and extends in the left-right direction. The supporting plate 25B at the rear projects upwardly from a rear end edge of the bottom plate 25D, and extends in the left-right direction.

As depicted in FIG. 5, the front end edge of the bottom plate 25D extends more to the front than the lateral plates 25L, 25R, and is positioned close to the front wall 11A of the scanner base 11. The supporting plate 25A at the front faces the front wall 11A from the rear. The rear end edge of the bottom plate 25D extends more to the rear than the lateral plates 25L, 25R, and is positioned close to the rear wall 11B of the scanner base 11. The supporting plate 25B at the rear faces the rear wall 11B from the front.

As depicted in FIGS. 9 and 10, two sets of a holding groove 26, a first positioning portion 21, and a second positioning portion 22 are formed in the holding member 25. The holding groove 26, the first positioning portion 21, and the second positioning portion 22 of the set positioned at the front and the holding groove 26, the first positioning portion 21, and second positioning portion 22 of the set positioned at the rear have left-right symmetrical identical shapes.

The holding groove 26 at the front recedes downwardly from a right portion of an upper end edge of the supporting plate 25A at the front. The holding groove 26 at the rear recedes downwardly from a right portion of an upper end edge of the supporting plate 25B at the rear.

A substantially U-shaped groove is formed in a portion close to the front end edge in the bottom plate 25D. The first positioning portion 21 at the front is formed by an inner portion of that groove being bent upwardly. A substantially U-shaped groove is formed in a portion close to the rear end edge in the bottom plate 25D. The first positioning portion 21 at the rear is formed by an inner portion of that groove being bent upwardly.

Two small pieces that project to the right from a portion close to the front end edge in the bottom plate 25D are bent upwardly. The second positioning portion 22 at the front is a groove formed between those small pieces. Two small pieces that project to the right from a portion close to the rear end edge in the bottom plate 25D are bent upwardly. The second positioning portion 22 at the rear is a groove formed between those small pieces.

The holding member 25 includes a facing surface 20A and a positioning recess 24. The facing surface 20A is an upper surface of the bottom plate 25D. The positioning recess 24 is a substantially rectangular shaped notch receding downwardly from an upper end edge in a rear portion of the lateral plate 25R on the right.

In the present embodiment, the guide member 27 is a resin member manufactured by injection molding of a thermoplastic resin. A guide hole 27H extending in the left-right direction is formed in the guide member 27. As depicted in FIG. 6, the guide member 27 is installed from below in a middle part in the front-rear direction in the holding member 25. By the guide shaft 28 being inserted in the guide hole 27H, the guide member 27 is configured to be slidable in the left-right direction with respect to the guide shaft 28.

Specific Configuration of Scanning Mechanism

As depicted in FIGS. 4 and 6, the scanning mechanism 29 includes a drive section 29M, a driven pulley 29P, and a timing belt 29T.

The drive section 29M is positioned close to the left wall 11L of the scanner base 11 and a left end of the guide shaft 28. The drive section 29M is configured from an electric motor, a group of a plurality of gears engaging with the electric motor, and an unillustrated drive pulley.

As depicted in FIG. 6, the driven pulley 29P is positioned close to the right wall 11R of the scanner base 11 and a right end of the guide shaft 28. The timing belt 29T is an endless belt wound around the unillustrated drive pulley of the drive section 29M and the driven pulley 29P. Although illustration of this is omitted, the timing belt 29T, while following the guide shaft 28, is coupled, at a specific place of a portion extending in the left-right direction of the timing belt 29T, to the guide member 27 of the moving member 20.

When the drive section 29M operates, the timing belt 29T circulates between the unillustrated drive pulley and the driven pulley 29P by forward rotation and reverse rotation of the electric motor. As a result, the moving member 20 is configured capable of reciprocating movement in the left-right direction which is the sub-scanning direction, on a reverse surface of the platen glass 81.

Specific Configuration of Reading Section

As depicted in FIGS. 3 to 11, and 13, the reading section 30 includes a reading surface 30A, a plurality of light-receiving elements 39, a substrate 31, and a case 40.

Figure 13:
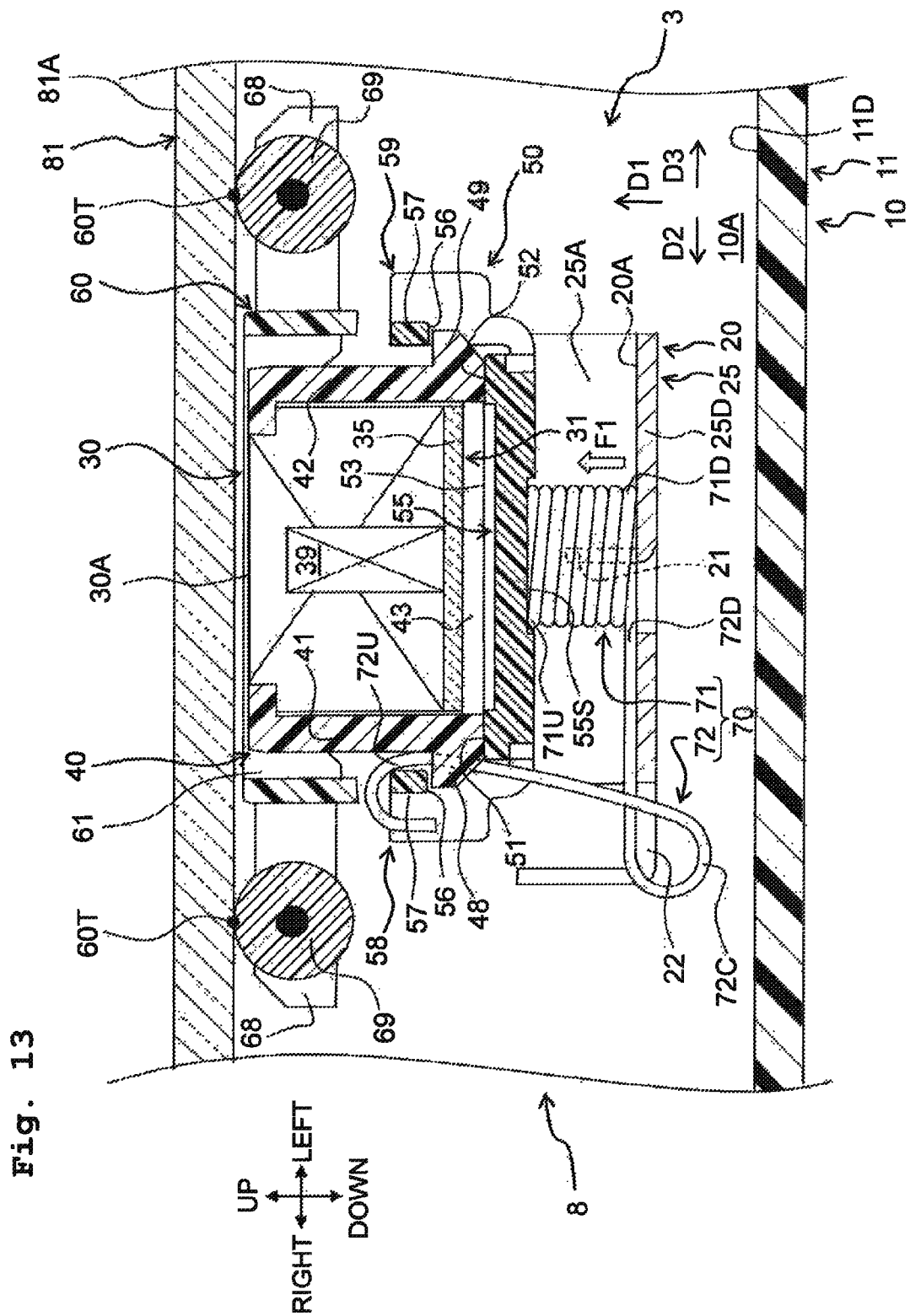
FIG. 13 is a partial cross-sectional view depicting a cross section taken along the line XIII-XIII of FIG. 5.

As depicted in FIGS. 5 and 13, the reading surface 30A faces the platen glass 81 from below, in a state where the reading section 30 is held in the moving member 20. As depicted in FIGS. 3, 4, and 6, the reading surface 30A extends from close to the front wall 11A to close to the rear wall 11B of the scanner base 11, in the front-rear direction which is the main scanning direction. The reading surface 30A has a length sufficient to exceed a front-rear width of an original sheet placed on the first supporting surface 81A.

The light-receiving elements 39 are each aligned in the front-rear direction which is the main scanning direction, below the reading surface 30A. The light-receiving elements 39 each configure a well-known image reading sensor such as a CIS (Contact Image Sensor) or a CCD (Charge Coupled Device).

As depicted in FIG. 13, the substrate 31 includes a circuit board 35 on which each of the light-receiving elements 39 is installed. The circuit board 35 faces the reading surface 30A from an opposite to the platen glass 81, that is, from below.

Figure 11:
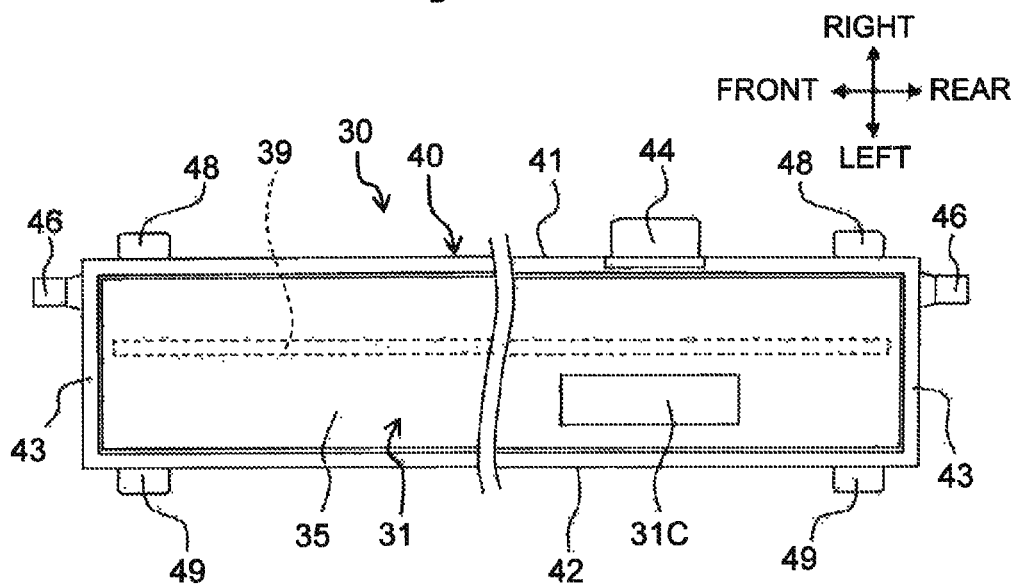
FIG. 11 is a partial bottom view of the reading section.

As depicted in FIGS. 10 and 11, the substrate 1 is of a substantially equal size to the reading surface 30A, and extends in a substantially rectangular shape in the front-rear direction and the left-right direction. A connector 31C is arranged in a rear portion of the substrate 31. The connector 31C is installed in the circuit board 35. One end of an unillustrated flat cable is connected to the connector 31C. The unillustrated flat cable has slack enabling it to follow the reciprocating movement of the moving member 20, and is housed within the housing space 10A. The other end of the unillustrated flat cable is connected to an unillustrated control unit provided within the main body 8.

As depicted in FIGS. 9 to 11, and 13, the case 40 is a substantially box-shaped resin member. In the present embodiment, the case 40 is manufactured by the likes of injection molding of a thermoplastic resin. The case 40 includes a first wall 41, a second wall 42, and a third wall 43.

The first wall 41 is adjacent to one of end edges, that is, a right end edge extending in the main scanning direction in the reading surface 30A. The first wall 41 is provided extending toward the moving member 20, that is, downwardly.

The second wall 42 is adjacent to the other of the end edges, that is, a left end edge extending in the main scanning direction in the reading surface 30A. The second wall 42 is provided extending toward the moving member 20, that is, downwardly.

The third wall 43 projects from both ends in the main scanning direction in the case 40, that is, from a front end and a rear end of the case 40 toward the moving member 20, that is, downwardly.

The first wall 41 and the second wall 42 each extend in the front-rear direction. The front and rear third walls 43 extend in the left-right direction. Front ends of the first wall 41 and the second wall 42 are connected to ends on the left and right of the third wall 43 at the front, and rear ends of the first wall 41 and the second wall 42 are connected to ends on the left and right of the third wall 43 at the rear. That is, the case 40 is a rectangular shaped frame formed by the first wall 41, the second wall 42, and the third wall 43. Moreover, the reading surface 30A is positioned at an upper end of the rectangular shaped frame.

As depicted in FIGS. 10, 11, and 13, the case 40 holds the substrate 31 between the first wall 41 and the second wall 42. Specifically, the substrate 31 is positioned at a lower end of the rectangular shaped frame configuring the case 40.

As depicted in FIGS. 9 to 11, a positioning shaft 46 is formed in each of the front and rear third walls 43. The positioning shaft 46 at the front projects to the front from a right lower corner portion in the third wall 43 at the front. The positioning shaft 46 at the rear projects to the rear from a right lower corner portion in the third wall 43 at the rear.

As depicted in FIGS. 9 to 11, and 13, a corner portion at the front and a corner portion at the rear at a lower end of the first wall 41 are each provided with a first projection 48 projecting to the right. A corner portion at the front and a corner portion at the rear at a lower end of the second wall 42 are each provided with a second projection 49 projecting to the left.

As depicted in FIGS. 9 to 11, a rear portion of the first wall 41 is provided with a positioning projection 44 projecting to the right. As depicted in FIG. 9, a fitting hole 40H is formed at each of four corner portions at a front end and rear end being an upper surface of the case 40, so as to recede downwardly from the upper surface.

As depicted in FIGS. 5, 6, and 8, the front and rear positioning shafts 46 of the case 40 are inserted in the front and rear holding grooves 26 of the holding member 25. In addition, as depicted in FIGS. 5 and 8, the positioning projection 44 of the case 40 is inserted in the positioning recess 24 of the holding member 25. In this way, the reading section 30 is held in the moving member 20 in a state where displacement in the up-down direction of the reading section 30 is allowed thereby enabling the reading section 30 to be brought close to the platen glass 81. In this state, the facing surface 20A of the holding member 25 faces the substrate 31 from an opposite to the reading surface 30, that is, from below, as depicted in FIG. 13.

Note that in the present embodiment, as depicted in FIGS. 10, 11, and 13, the reading section 30 does not have a back-surface wall configuring its back surface. In other words, the case 40 of the reading section 30 does not include a bottom wall covering the substrate 31 from below. Therefore, the substrate 31 is in a state of being exposed from the case 40 or in a state of being covered by the likes of a sheet-like cover member installed in the case 40.

Specific Configuration of Spacer

As depicted in FIGS. 4 to 10, and 13, the spacer 60 is installed in each of the front end and rear end of the case 40. The spacer 60 at the front and the spacer 60 at the rear are identical components, and only differ in their installment posture.

As depicted in FIGS. 9 and 10, the spacer 60 includes a facing portion 61, an engaging portion 65, a pair of rotating member holders 68, and a pair of rotating members 69. The facing portion 61 is configured in a substantially C shape capable of covering the front end or rear end of the case 40 from above. Two fitting pins 61P are provided projecting downwardly on a back of the facing portion 61. The engaging portion 65 projects from a left end or right end of the facing portion 61 toward a middle part in the front-rear direction of the case 40, and then projects downwardly. The rotating member holders 68 are each formed in the left end and the right end of the facing portion 61. The rotating member holders 68 each project so as to be separated from each other in the left-right direction. The rotating members 69 are each rotatably supported in a corresponding rotating member holder 68.

As depicted in FIGS. 9 and 10, each of the fitting pins 61P is fitted to the two fitting holes 40H provided in the front end or the rear end of the case 40, whereby the facing section 61 is faced onto the reading surface 30A from above. Moreover, as depicted in FIGS. 5 and 8, the engaging section 65 is engaged with the first wall 41 or the second wall 42. At this time, the engaging section 65, due to its above-mentioned bent shape, detours the later-described transmission member 50 to approach the moving member 20. In this way, the spacer 60 is installed in the case 40, and the rotating members 69 each attain a state of projecting toward the platen glass 81 from both ends in the main scanning direction in the reading section 30.

Specific Configuration of Transmission Member

As depicted in FIGS. 9, 10, 12, and 13, in the present embodiment, the transmission member 50 is a resin member manufactured by the likes of injection molding of a thermoplastic resin. As depicted in FIG. 5, transmission members 50 which are identical components are respectively provided between the front end of the case 40 and a front end of the holding member 25 and between the rear end of the case 40 and a rear end of the holding member 25.

As depicted in FIGS. 9, 10, 12, and 13, the transmission member 50 includes a connecting portion 55, a first contacting portion 51, a second contacting portion 52, a third contacting portion 53, a first projecting portion 58, and a second projecting portion 59.

Figure 12:
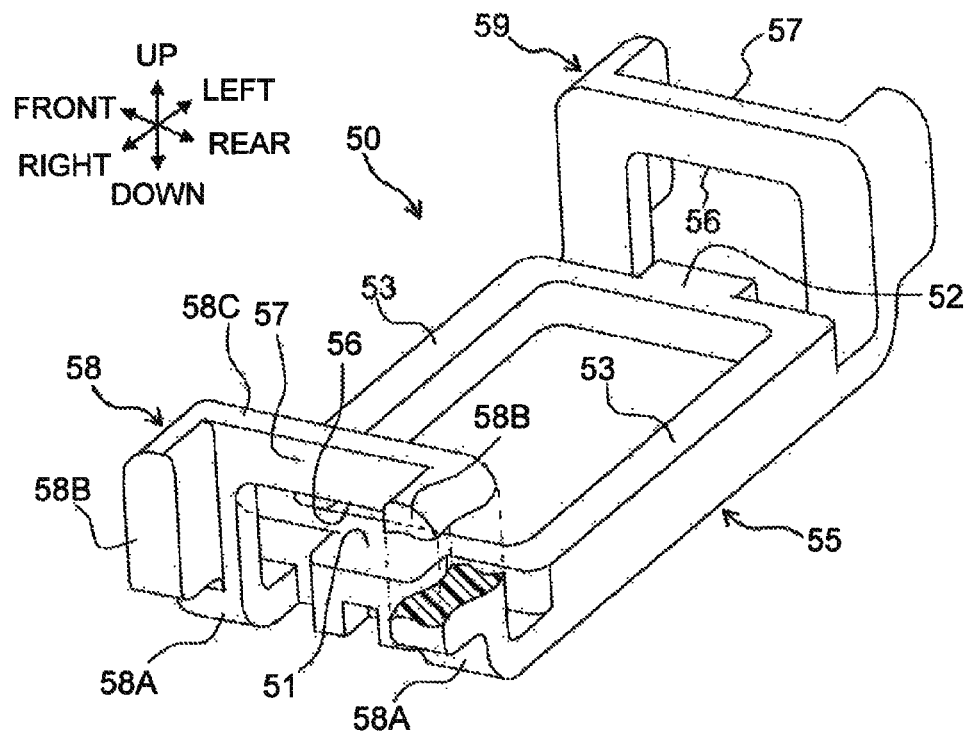
FIG. 12 is a perspective view of the transmission member.

As depicted in FIG. 12, the connecting portion 55 is a large substantially rectangular plate-like portion whose length in the left-right direction is larger than its length in the front-rear direction. A substantially rectangular ring-shaped peripheral part of the connecting portion 55 is a level higher than a central part of the connecting portion 55.

An upper surface of one side at the front of the peripheral part of the connecting portion 55 is configured as the first contacting portion 51. The first contacting portion 51 has its middle part in the front-rear direction projecting to the right. An upper surface of one side at the rear of the peripheral part of the connecting portion 55 is configured as the second contacting portion 52. The second contacting portion 52 has its middle part in the front-rear direction projecting to the left. An upper surface of one side on the left and an upper surface of one side on the right of the peripheral part of the connecting portion 55 are configured as the third contacting portion 53.

The first projecting portion 58 includes a pair of bent portions 58A, a pair of projecting portions 58B, and a joining portion 58C. Both bent portions 58A respectively project to the right from the two corner portions on the right of the connecting portion 55 and are then bent upwardly. Both bent portions 58A project more upwardly than the first through third contacting portions 51 to 53. Both projecting portions 58B project to the right from right surfaces of both bent portions 58A. The joining portion 58C connects upper ends of both bent portions 58A in the front-rear direction.

An engaging portion 56 and a housing portion 57 are formed in the first projecting portion 58. The engaging portion 56 is a recess partitioned by inner surfaces facing each other of both bent portions 58A and by a lower surface of the joining portion 58C. The housing portion 57 is a recess partitioned by inner surfaces facing each other of both projecting portions 58B and by a right surface of the joining portion 58C.

The second projecting portion 59 has a left-right symmetrical identical shape to the first projecting portion 58, hence a description thereof will be omitted. The engaging portion 56 and the housing portion 57 are formed also in the second projecting portion 59, similarly to in the first projecting portion 58.

As depicted in FIGS. 10 and 13, a spring bearing 55S is provided receding upwardly in a central part of a back of the connecting portion 55.

As depicted in FIG. 13, in the transmission member 50 at the front, the engaging portion 56 of the first projecting portion 58 projecting upwardly along the first wall 41 from a right end of the connecting portion 55 engages with the first projection 48 at the front of the case 40. In addition, the engaging section 56 of the second projecting section 59 projecting upwardly along the second wall 42 from a left end of the connecting section 55 engages with the second projection 49 at the front of the case 40. As a result, the transmission member 50 at the front is installed from below in the front end of the case 40. The transmission member 50 at the rear is also similarly installed from below in the rear end of the case 40.

In a state where each of the transmission members 50 has been installed in the front end and the rear end of the case 40, the first contacting portion 51 abuts in a first direction D1 on an end in a position adjacent to the substrate 31 of the first wall 41, that is, on a lower end of the first wall 41. The second contacting portion 52 abuts in the first direction D1 on an end in a position adjacent to the substrate 31 of the second wall 42, that is, on a lower end of the second wall 42. The third contacting portion 53 abuts in the first direction D1 on an end in a position adjacent to the substrate 31 of the third wall 43, that is, on a lower end of the third wall 43. In the present embodiment, the first direction D1 is a direction orthogonal to the first supporting surface 81A of the platen glass 81 and approaching the platen glass 81 from below.

Moreover, in this state, the connecting portion 55 extends in the left-right direction which is the sub-scanning direction while being separated from below from the substrate 31. The connecting portion 55 faces the substrate 31 from below while connecting the first contacting portion 51 and the second contacting portion 52 in the left-right direction.

Specific Configuration of Biasing Member

As depicted in FIGS. 9, 10, and 13, the biasing member 70 is a single member formed by a metal wire material being bent. The biasing member 70 includes a coil spring portion 71 and a pressing portion 72. The coil spring portion 71 is an example of a "first biasing section" of the present disclosure. The pressing portion 72 is an example of a "second biasing section" of the present disclosure. The biasing member 70 is an example of "first and second biasing sections which are a single member configured from a metal wire material" of the present disclosure.

As depicted in FIG. 5, biasing members 70 which are identical components are respectively provided between the transmission member 50 installed in the front end of the case 40 and the front end of the holding member 25 and between the transmission member 50 installed in the rear end of the case 40 and the rear end of the holding member 25.

As depicted in FIG. 13, the coil spring portion 71 is wound in a coil shape from an upper end 71U to a lower end 71D. The lower end 71D of the coil spring portion 71 is an example of "one end of the first biasing section" of the present disclosure. The upper end 71U of the coil spring portion 71 is an example of "the other end of the first biasing section" of the present disclosure.

The lower end 71D of the coil spring portion 71, by having the first positioning portion 21 inserted therein, is positioned in the holding member 25 in a state of abutting on the facing surface 20A. In a state of the coil spring portion 71 having been compressively deformed, the upper end 71U of the coil spring portion 71 abuts from below on the spring bearing portion 55S provided receding in the connecting portion 55 of the transmission member 50.

The upper end 71U of the coil spring portion 71 abuts in the first direction D1 on the connecting portion 55 of the transmission member 50, the first contacting portion 51 of the transmission member 50 abuts in the first direction D1 on the lower end of the first wall 41, and the second contacting portion 52 of the transmission member 50 abuts in the first direction D1 on the lower end of the second wall 42. In this way, a biasing force F1 of the coil spring portion 71 is transmitted to the case 40. Moreover, the biasing force F1 of the coil spring portion 71 is transmitted to the case 40 also by the third contacting portion 53 of the transmission member 50 abutting in the first direction D1 on the lower end of the third wall 43. In this configuration, a lower surface of the substrate 31 and respective upper surfaces of the first through third contacting portions 51 to 53 of the transmission member 50 are non-contacting.

In this way, the coil spring portions 71 of the biasing members 70 disposed at the front and rear within the housing space 10A bias the reading section 30 in the first direction D1, via the transmission member 50, and cause the reading surface 30A to approach the platen glass 81.

Moreover, due to the biasing force F1 of the coil spring portions 71, the rotating members 69 of the spacers 60 at the front and rear abut rotatably on the platen glass 81. Now, a top 60T of the spacer 60 is a portion abutting on the platen glass 81 of an outer circumferential surface of the rotating member 69. By the top 60T of the spacer 60 abutting on the platen glass 81, a spacing between the reading surface 30A and the first supporting surface 81A is maintained constant.

As depicted in FIG. 5, at the front and rear in the housing space 10A, the coil spring portion 71 of the biasing member 70 and the transmission member 50 have a portion overlapping the spacer 60, when viewed from a direction (up-down direction) orthogonal to the main scanning direction and the sub-scanning direction, that is, from the up-down direction. More specifically, a virtual plane K1 extending in the left-right direction which is the sub-scanning direction and extending in the first direction D1 to pass through the top 60T of the spacer 60 passes through the reading section 30, the coil spring portion 71 of the biasing member 70, and the transmission member 50.

As depicted in FIG. 13, a base end 72D of the pressing portion 72 is connected to the lower end 71D of the coil spring portion 71, and makes a contact with the facing surface 20A of the holding member 25. The base end 72D of the pressing portion 72 is an example of "one end of the second biasing section" of the present disclosure. The pressing portion 72 extends to the right from the base end 72D, after which it is bent downwardly. Then, the pressing portion 72 describes a circular arc, after which it extends upwardly. A portion describing the circular arc of the pressing portion 72 is a middle section 72C of the pressing portion 72. The middle section 72C of the pressing portion 72 is inserted in the second positioning portion 22, and thereby positioned in the holding member 25.

The pressing portion 72 extends upwardly from the middle section 72C to reach a tip end 72U. The tip end 72U of the pressing portion 72 is doubled back so as to describe a substantially ½ circular arc to the right. The tip end 72U of the pressing portion 72 is an example of "the other end of the second biasing section" of the present disclosure. The tip end 72U of the pressing portion 72 is housed in the housing portion 57 of the first projecting section 58 in a state where the tip end 72U of the pressing portion 72 makes a contact with the first wall 41.

The sub-scanning direction, that is, a moving direction when the reading section 30 reads an image of a manuscript supported by the first supporting surface 81A is defined as a second direction D2. The second direction D2 is a rightward direction parallel to the left-right direction. A direction opposite to the second direction D2 is defined as a third direction D3. The third direction D3 is a leftward direction parallel to the left-right direction.

The first wall 41 is in a position displaced in the second direction D2 with respect to the reading surface 30A. The second wall 42 is in a position displaced in the third direction D3 with respect to the reading surface 30A. The tip end 72U of the pressing portion 72 abuts from the right on the first wall 41, and biases the case 40 in the third direction. As a result, as depicted in FIGS. 9 and 10, the positioning shaft 46 at the front and rear of the case 40 are pressed against inner walls on the left in the holding grooves 26 at the front and rear of the holding member 25, whereby rattling of each of the positioning shaft 46 in each of the holding grooves 26 is suppressed.

Image Reading Operation

In this image reading apparatus 1, an image of an original sheet supported on the first supporting surface 81A is read by the reading section 30, while the moving member 20 is moved. In this case, the unillustrated control unit controls the scanning mechanism 29 and the reading section 30, and the reading section 30 mounted on the moving member 20 is moved in the left-right direction between a reading start position which is below a left end edge of the first supporting surface 81A and a reading finish position which is below a right end edge of the first supporting surface 81A, by the drive section 29M. As a result, the reading section 30 reads the image of the original sheet placed on the first supporting surface 81A. Then, the scanning mechanism 29 moves the reading section 30 from a right edge to a left edge in the housing space 10A, and returns the reading section 30 to a standby position.

Moreover, in this image reading apparatus 1, a plurality of sheets supported by the supply tray 9A are conveyed one at a time by the conveyer 4 to have their images read. In this case, the unillustrated control unit controls the scanning mechanism 29 and the reading section 30, and the reading section 30 mounted on the moving member 20 is stopped at a standstill reading position below the second supporting surface 81B, by the drive section 29M. Then, when the conveyer 4 sequentially conveys the sheets supported by the supply tray 9A along the conveyance path P1, those sheets pass over the reading section 30 in the standstill reading position, whereby the reading section 30 reads the images of those passing sheets. Then, the scanning mechanism 29 returns the reading section 30 that has finished reading, to the standby position.

Operational Effects of Embodiment

In the image reading apparatus 1 of the embodiment, as depicted in the likes of FIG. 13, the biasing member 70 is disposed at the front and rear in the housing space 10A. The upper end 71U of the coil spring portion 71 of the biasing member 70 abuts in the first direction D1 on the connecting portion 55 of the transmission member 50, the first contacting portion 51 of the transmission member 50 abuts in the first direction D1 on the lower end of the first wall 41, and the second contacting portion 52 of the transmission member 50 abuts in the first direction D1 on the lower end of the second wall 42. As a result, the biasing force F1 of the coil spring portion 71 of the biasing member 70 is transmitted to the case 40. Moreover, the biasing force F1 of the coil spring portion 71 is transmitted to the case 40 also by the third contacting portion 53 of the transmission member 50 abutting in the first direction D1 on the lower end of the third wall 43. In this configuration, the lower surface of the substrate 31 and the respective upper surfaces of the first through third contacting portions 51 to 53 of the transmission member 50 are non-contacting.

In this way, the reading section 30 is biased toward the platen glass 81 in a state where it is difficult for the biasing force F1 of the coil spring portion 71 of the biasing member 70 to act on the substrate 31. Therefore, in this image reading apparatus 1, even if a cover or a wall covering the lower surface of the substrate 31 is omitted and simplification of the reading section 30 (case 40) is sought, it is possible to suppress that the biasing force F1 acts on the substrate 31.

As a result, it becomes difficult for the circuit board 35 of the substrate 31 to warp, and misalignment in positioning of each of the light-receiving elements 39 installed in the circuit board 35 can be suppressed.

Therefore, in the image reading apparatus 1 of the embodiment, simplification of the reading section 30 can be achieved while a lowering of reading performance of the reading section 30 is suppressed. Furthermore, miniaturization or lowering of manufacturing costs of the image reading apparatus 1 can be achieved.

Moreover, in this image reading apparatus 1, as depicted in FIG. 5, the coil spring portion 71 of the biasing member 70 and the transmission member 50 have a portion overlapping the spacer 60, when viewed from a direction orthogonal to the main scanning direction and the sub-scanning direction, that is, from the up-down direction. As a result, the coil spring portion 71 of the biasing member 70 and the transmission member 50 can be compactly disposed in a periphery of the spacer 60, and this is effective in miniaturization of the apparatus in the main scanning direction.

Furthermore, in this image reading apparatus 1, as depicted in FIG. 5, a virtual plane K1 extending in the sub-scanning direction and extending in the first direction D1 to pass through the top 60T of the spacer 60 passes through the reading section 30, the coil spring portion 71 of the biasing member 70, and the transmission member 50. As a result, a position that the biasing force F1 of the coil spring portion 71 of the biasing member 70 acts on the case 40 is roughly in the virtual plane K1. In other words, that biasing force F1 and a reaction force R1 acting on the top 60T oppose each other in a non-conflicting manner. As a result, in this image reading apparatus 1, warping of a peripheral part of the spacer 60 in the case 40 can be suppressed.

Moreover, in this image reading apparatus 1, as depicted in FIGS. 5 and 8, in the spacer 60, the engaging portion 65 extending toward the moving member 20 while detouring the transmission member 50 engages with the first wall 41 or the second wall 42. As a result, it is suppressed that the spacer 60 installed in the case 40 gets out of place. Moreover, regarding the transmission member 50, work of abutting the first contacting portion 51 on the first wall 41 and abutting the second contacting portion 52 on the second wall 42 can be easily performed without being hindered by the engaging portion 65 of the spacer 60. As a result, in this image reading apparatus 1, simplification of installing work can be achieved.

Furthermore, in this image reading apparatus 1, as depicted in FIGS. 5 and 13, due to the spacer 60 abutting on the platen glass 81 by the rotating member 69, resistance acting on the spacer 60 from the platen glass 81 can be significantly reduced.

Moreover, in this image reading apparatus 1, as depicted in FIG. 13, the connecting portion 55 of the transmission member 50 is downwardly separated from the substrate section 31. As a result, even when the connecting portion 55 warps by being pressed by the upper end 71U of the coil spring portion 71 of the biasing member 70, it is difficult for the connecting portion 55 to contact the substrate 31, hence it is even more difficult for the circuit board 35 of the substrate 31 to warp. Moreover, since the first and second projecting portions 58, 59 of the transmission member 50 sandwich the first and second walls 41, 42 from the left-right direction which is the sub-scanning direction, work of installing the transmission member 50 in the case 40 is easy to perform.

Furthermore, in this image reading apparatus 1, as depicted in FIG. 13, the transmission member 50 is supported at three points in the case 40, by the first through third contacting portions 51 to 53 abutting on the lower ends of the first through third walls 41 to 43. As a result, the transmission member 50 can stably transmit to the case 40 the biasing force F1 of the coil spring portion 71 of the biasing member 70.

Moreover, in this image reading apparatus 1, as depicted in FIG. 13, the tip end 72U of the pressing portion 72 makes a contact with the first wall 41 and biases the reading section 30 in the third direction D3 which is the leftward direction. As a result, as depicted in FIGS. 9 and 10, the positioning shaft 46 at the front and rear of the case 40 are pressed against inner walls on the left in the holding grooves 26 at the front and rear of the holding member 25, whereby rattling of each of the positioning shaft sections 46 in each of the holding grooves 26 is suppressed. As a result, in this image reading apparatus 1, a position in the sub-scanning direction of the reading section 30 with respect to the moving member 20 moving in the second direction D2 which is the rightward direction, can be stabilized by the pressing portion 72.

Furthermore, in this image reading apparatus 1, as depicted in FIG. 13, the coil spring portion 71 acting as the first biasing section and the pressing portion 72 acting as the second biasing section are formed in the biasing member 70 which is a single member configured from a metal wire material. The coil spring portion 71 is wound in a coil shape. The pressing portion 72 extends from the lower end 71D of the coil spring portion 71 to undergo bending. The tip end 72U of the pressing portion 72 makes a contact with the first wall 41. Such a configuration enables this image reading apparatus 1 to achieve simplification of the first and second biasing sections and a reduction in the number of components.

Moreover, in this image reading apparatus 1, as depicted in FIG. 13, the coil spring portion 71 is positioned by the first positioning portion 21 formed in the holding member 25. The middle section 72C of the pressing portion 72 is positioned by the second positioning portion 22 formed in the holding member 25. The tip end 72U of the pressing portion 72 is housed by the housing portion 57 formed in the transmission member 50. Such a configuration enables this image reading apparatus 1 to achieve simplification of installing work of the coil spring portion 71 and the pressing portion 72. Moreover, the tip end 72U of the pressing portion 72 being housed in the housing portion 57 makes it difficult for a position that the tip end 72U of the pressing portion 72 makes a contact with the first wall 41 to get out of place. As a result, the pressing portion 72 can reliably bias the reading section 30 in the third direction D3.

That concludes description of the present disclosure based on the embodiment. However, the present disclosure is not limited to the above-described embodiment, and may of course be applied appropriately changed in a range not departing from the spirit of the present disclosure.

For example, the first biasing section and the second biasing section are not limited to the configuration of the embodiment. The first biasing section and the second biasing section may have shapes different from in the embodiment. Moreover, the first biasing section and the second biasing section may be separate members.

The first biasing section and the transmission member need not overlap the top of the spacer. For example, the first biasing section and the transmission member may be disposed in a position displaced toward a central part in the main scanning direction from the position in the embodiment.

The present disclosure may be utilized in an image reading apparatus, a multifunction peripheral, or the like.

What is claimed is:

1. An image reading apparatus configured to read an image of a sheet, comprising:
   a platen glass configured to support the sheet on one surface of the platen glass;
   a moving member configured to be movable in a sub-scanning direction along the other surface of the platen glass;
   an image reader supported by the moving member, the image reader including:
      a reading surface facing the other surface of the platen glass;
      a plurality of light-receiving elements aligned in a main scanning direction orthogonal to the sub-scanning direction;
      a substrate facing the reading surface from an opposite to the platen glass and including a circuit board in which each of the light-receiving elements is arranged; and
      a case holding the substrate;
   a transmission member arranged between the image reader and the moving member; and
   a first biasing portion configured to bias the image reader in a first direction which is a direction approaching the platen glass,
   wherein the moving member includes a facing surface that faces the substrate from an opposite to the reading surface,
   wherein the case includes:
      a first wall which extends toward the moving member and which is adjacent to one of two edges, of the reading surface, extending in the main scanning direction; and
      a second wall which holds the substrate between the second wall and the first wall, which extends toward the moving member, and which is adjacent to the other of the edges, of the reading surface, extending in the main scanning direction,
   wherein the transmission member includes:
      a first contacting portion which makes a contact with an end of the first wall in the first direction, wherein the end of the first wall is located at a position adjacent to the substrate;
      a second contacting portion which makes a contact with an end of the second wall in the first direction, wherein the end of the second wall is located at a position adjacent to the substrate; and
      a connecting portion which faces the substrate and which extends in the sub-scanning direction to connect the first contacting portion and the second contacting portion, and
   wherein one end of the first biasing portion makes a contact with the facing surface of the moving member and the other end of the first biasing portion makes a contact with the connecting portion of the transmission member.

2. The image reading apparatus according to claim 1, further comprising a spacer which projects toward the platen glass from both ends of the image reader in the main scanning direction and of which top portion makes contact with the other surface of the platen glass,
   wherein the first biasing portion and the transmission member overlap with the spacer, in a direction orthogonal to the main scanning direction and in the sub-scanning direction.

3. The image reading apparatus according to claim 2, wherein a virtual plane, which extends in the sub-scanning direction and which extends in the first direction to pass through the top of the spacer, passes through the image reader, the first biasing portion, and the transmission member.

4. The image reading apparatus according to claim 2, wherein the spacer includes:
   a facing portion facing the reading surface; and
   an engaging portion configured to engage with one of the first wall and the second wall, wherein the engaging portion is connected to the facing section and extends toward the moving member while detouring the transmission member.

5. The image reading apparatus according to claim 2, wherein the spacer includes a rotating member configured to make a contact with the platen glass to rotate on the platen glass, and
   the top portion of the spacer is a portion, of an outer peripheral surface of the rotating member, contacting with the platen glass.

6. The image reading apparatus according to claim 1, wherein the connecting portion extends in the sub-scanning direction while being separated from the substrate, and
   the transmission member includes:
   a first projection projecting in the first direction along the first wall from one end in the sub-scanning direction in the connecting section; and
   a second projection projecting in the first direction along the second wall from the other end in the sub-scanning direction in the connecting section.

7. The image reading apparatus according to claim 1, wherein the case includes a third wall which projects toward the moving member from both ends of the case in the main scanning direction and extends in the sub-scanning direction, and
   the transmission member includes a third contacting portion which makes a contact with an end of the third wall in the first direction, wherein the end of the third wall is located at a position adjacent to the substrate.

8. The image reading apparatus according to claim 1, wherein the first wall is in a position displaced in one side in the sub-scanning direction with respect to the reading surface, the one side in the sub-scanning direction being a moving direction when the image reader reads the image of the sheet supported by the platen glass,
   the second wall is in a position displaced in the other side in the sub-scanning direction with respect to the reading surface, and
   the image reading apparatus further comprises a second biasing portion, wherein one end of the second biasing portion makes contact with the moving member, the other end of the second biasing portion makes contact with the first wall, and the second biasing portion biases the image reader in the other side in the sub-scanning direction.

9. The image reading apparatus according to claim 8, wherein
   the first biasing portion and the second biasing portion are formed integrally by a metal wire material,
   the first biasing portion is a coil spring portion wound in a coil shape, and
   the second biasing portion is a pressing portion bent extending from one end of the coil spring portion, and a tip end of the pressing portion makes contact with the first wall.

10. The image reading apparatus according to claim 9, wherein
    the moving member includes a first positioning portion which positions the coil spring portion and a second positioning portion which positions a middle part of the pressing portion, and
    the transmission member includes a housing which houses the tip end of the pressing portion.

* * * * *